(12) United States Patent
Tsukamoto

(10) Patent No.: US 10,916,246 B2
(45) Date of Patent: Feb. 9, 2021

(54) INFORMATION PROCESSING DEVICE, IN-VEHICLE DEVICE, AND STORAGE MEDIUM

(71) Applicant: TOYOTA JIDOSHA KABUSHIKI KAISHA, Toyota (JP)

(72) Inventor: Jun Tsukamoto, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 153 days.

(21) Appl. No.: 16/109,113

(22) Filed: Aug. 22, 2018

(65) Prior Publication Data

US 2019/0066678 A1    Feb. 28, 2019

(30) Foreign Application Priority Data

Aug. 24, 2017  (JP) ................. 2017-161373

(51) Int. Cl.
| | |
|---|---|
| *G10L 15/22* | (2006.01) |
| *G10L 15/00* | (2013.01) |
| *G06F 3/16* | (2006.01) |
| *G10L 15/08* | (2006.01) |
| *G10L 15/01* | (2013.01) |
| *G10L 15/02* | (2006.01) |

(52) U.S. Cl.
CPC .............. *G10L 15/22* (2013.01); *G06F 3/167* (2013.01); *G10L 15/005* (2013.01); *G10L 15/01* (2013.01); *G10L 15/08* (2013.01); *G10L 2015/027* (2013.01); *G10L 2015/088* (2013.01); *G10L 2015/223* (2013.01)

(58) Field of Classification Search
CPC ......... G10L 19/04; G10L 19/12; G10L 19/02; G10L 19/06; G10L 2019/0004; G10L 2019/0007; G10L 2019/0013; G10L 25/27; G10L 13/04; G10L 15/02; G10L 15/183; G10L 15/197; G10L 19/005; G10L 19/0208; G10L 19/0212; G10L 19/13; G10L 21/0364; G10L 25/90; G10L 25/93
See application file for complete search history.

(56) References Cited

U.S. PATENT DOCUMENTS

| | | | | |
|---|---|---|---|---|
| 5,828,996 A | * | 10/1998 | Iijima | ..................... G10L 19/04 704/220 |
| 9,275,637 B1 | * | 3/2016 | Salvador | ................. G10L 15/01 |
| 9,373,321 B2 | * | 6/2016 | Bapat | ..................... G10L 15/06 |
| 2015/0039311 A1 | * | 2/2015 | Clark | ..................... G10L 25/84 704/244 |

FOREIGN PATENT DOCUMENTS

| | | | |
|---|---|---|---|
| JP | 2016-218852 A | 12/2016 | |
| WO | WO-2017217978 A1 * | 12/2017 | ............. G10L 15/08 |

* cited by examiner

*Primary Examiner* — Matthew H Baker
(74) *Attorney, Agent, or Firm* — Hunton Andrews Kurth LLP

(57) ABSTRACT

An information processing device enables a user to register a wake-up-word for activating a predetermined function by voice recognition. The information processing device includes a receiving unit configured to receive, from a user, an input word for registering a wake-up-word, and a determination unit configured to determine whether the input word received by the receiving unit satisfies conditions for an accuracy of voice recognition.

10 Claims, 5 Drawing Sheets

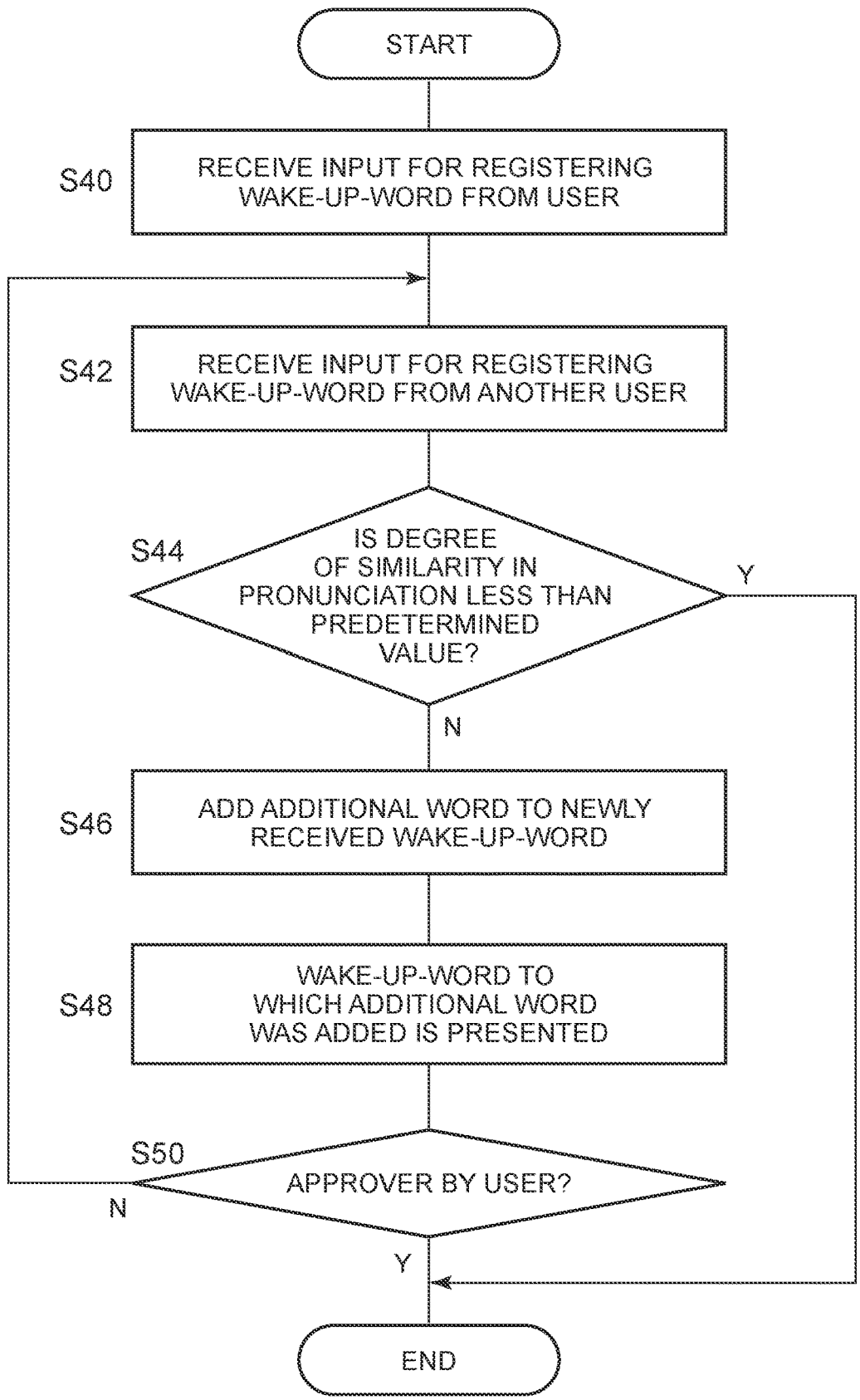

INFORMATION PROCESSING DEVICE, IN-VEHICLE DEVICE, AND STORAGE MEDIUM

INCORPORATION BY REFERENCE

The disclosure of Japanese Patent Application No. 2017-161373 filed on Aug. 24, 2017, including the specification, drawings and abstract is incorporated herein by reference in its entirety.

BACKGROUND

1. Technical Field

This disclosure relates to an information processing device, an in-vehicle device and a storage medium, for processing information of a wake-up-word that activates a predetermined function by voice recognition.

2. Description of Related Art

A technology for activating a predetermined function by voice recognition of a wake-up-word vocalized by a user is known (for example, Japanese Unexamined Patent Application Publication No. 2016-218852). According to this technology, when a user's action satisfies a predetermined condition, a predetermined word is used as a wake-up-word only for a period of time in addition to a normal wake-up-word.

SUMMARY

The aforementioned technology uses a preset fixed wake-up-word from which voice can easily be recognized, and does not suppose that a user freely sets a wake-up-word. While it is considered that convenience in use will be improved if the user can freely set a wake-up-word, it is possible that a wake-up-word for which voice recognition is difficult will be set and in such case, activation may become difficult.

The disclosure was made in consideration of the above-described situation, and has the objective of providing an information processing device, an in-vehicle device and a storage medium, capable of confirming whether a wake-up-word set by a user is appropriate.

An information processing device according to a first aspect of the disclosure, enables a user to register a wake-up-word for activating a predetermined function by voice recognition. The information processing device includes a receiving unit configured to receive, from the user, an input word for registration as a wake-up-word, and a determination unit configured to determine whether the input word received by the receiving unit satisfies a condition for an accuracy of voice recognition.

According to the first aspect, since it is determined whether a wake-up-word set by the user satisfies the condition for the accuracy of voice recognition, it is possible to confirm, based on the determination result, whether the wake-up-word is appropriate.

The condition may be that the number of syllables of the input word is equal to or greater than a predetermined number. The information processing device may further include an addition unit configured to add a predetermined additional word to the input word so that the number of syllables of the input word becomes equal to or greater than the predetermined number, when the determination unit determines that the number of syllables of the input word is less than the predetermined number, and a presentation unit configured to present the input word to which the additional word was added by the addition unit.

The condition may be that the number of predetermined syllables susceptible to false recognition in the input word is less than a predetermined number. The information processing device may further include a presentation unit configured to present instructions for the user to reset the wake-up-word when the determination unit determines that the number of the predetermined syllables in the input word is equal to or greater than the predetermined number.

The condition may be that the number of the predetermined syllables susceptible to false recognition in the input word is expected to be less than a predetermined number. The information processing device may further include an addition unit configured to, when the determination unit determines that the number of the predetermined syllables susceptible to false recognition in the input word is equal to or greater than the predetermined number, add a predetermined additional word to the input word so that a ratio of the number of the predetermined syllables susceptible to false recognition to the number of syllables of the input word becomes less than a predetermined ratio, and a presentation unit configured to present the input word to which the additional word was added by the addition unit.

In the information processing device according to the first aspect, the predetermined syllables susceptible to false recognition may include syllables of the "sa" column of the kana syllabary of the Japanese alphabet system.

The condition may be that when the receiving unit has already received a first input word for registration as a wake-up-word from a first user while the receiving unit newly receives a second input word for registration as a wake-up-word from a second user, a degree of similarity in pronunciation between the first input word and the second input word is less than a predetermined value. The information processing device may further include an addition unit configured to add a predetermined additional word to the second input word when the determination unit determines that the degree of similarity in pronunciation is equal to or greater than the predetermined value, and a presentation unit configured to present the second input word to which the additional word was added by the addition unit.

The information processing device according to the first aspect, the degree of similarity in pronunciation is derived based on the number of identical phonemes between the first input word and the second input word, or is derived as likelihood of the degree of similarity based on phoneme strings of the first input word and the second input word.

The information processing device according to the first aspect may further include a storage unit configured to store the received input word as the wake-up-word when the received input word satisfies the condition.

A second aspect of the disclosure relates to an in-vehicle device for activating a predetermined function by voice recognition. The in-vehicle device includes a receiving unit configured to receive, from a user, an input word for registration as a wake-up-word configured to activate a predetermined function by voice recognition, a determination unit configured to determine whether the input word received by the receiving unit satisfies a condition for an accuracy of voice recognition, a storage unit configured to store the received input word as the wake-up-word when the received input word satisfies the condition for the accuracy of voice recognition, a voice recognition unit configured to, after the wake-up-word is stored in the storage unit, perform voice recognition for information on speech spoken by the user, a comparison unit configured to compare a voice recognition result with the wake-up-word stored in the storage unit and outputting a comparison result, and an activation unit configured to activate the predetermined function when the comparison result is that the voice recognition result matches the wake-up-word.

A third aspect of the disclosure relates to a computer readable storage medium. The computer readable storage medium stores a program. The program includes commands that, when executed by a processor, cause the processor to perform the steps of receiving, from a user, an input word for registration as a wake-up-word for activating a predetermined function by voice recognition, and determining whether the received input word satisfies a condition for an accuracy of voice recognition.

According to the disclosure, it is possible to confirm whether a wake-up-word set by a user is adequate.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a flowchart showing the registration process of a wake-up-word in the information processing device according to a third embodiment.

DETAILED DESCRIPTION OF EMBODIMENTS

First Embodiment

Figure 1:
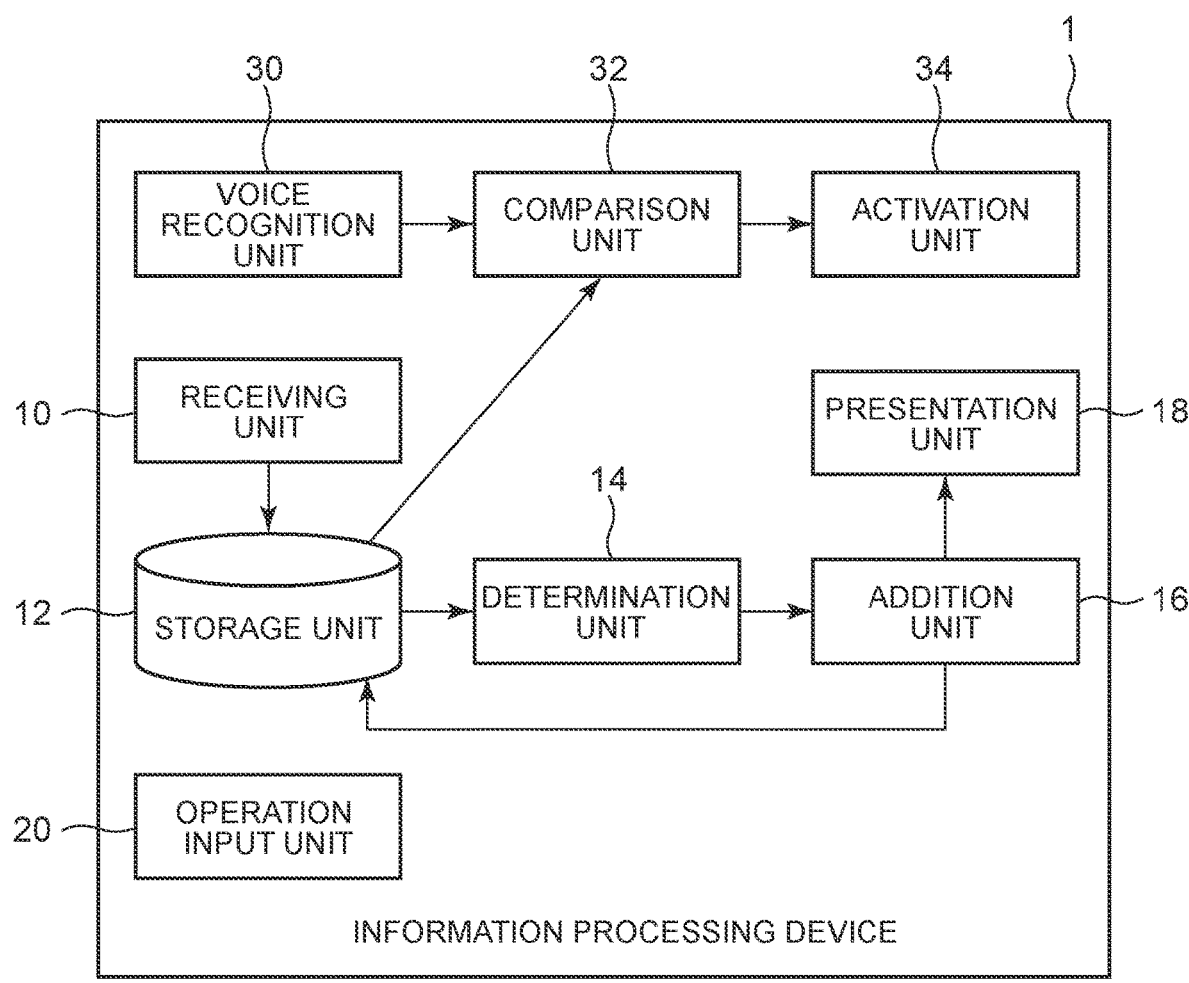
FIG. 1 is a block diagram showing the configuration of an information processing device according to a first embodiment.

FIG. 1 is a block diagram showing the configuration of an information processing device 1 according to a first embodiment. The information processing device 1 may be included in mobile devices, such as smart phones, cellular phones, tablet terminals, notebook computers, wearable terminals, or may be included in stationary electronic equipment, such as desktop computers, or may be included in-vehicle device, such as a navigation device mounted on a vehicle. The information processing device 1 comprises a receiving unit 10, a storage unit 12, a determination unit 14, an addition unit 16, a presentation unit 18, a voice recognition unit 30, a comparison unit 32, and an activation unit 34

The receiving unit 10 receives, from a user, an input for registering a wake-up-word for activating a predetermined function by voice recognition. The wake-up-word is also referred to as an activation phrase. The receiving unit 10 receives the input for registering the wake-up-word by the user's inputting of characters. The receiving unit 10 may also receive the input for registering the wake-up-word by the user's voice input. The receiving unit 10 outputs the received wake-up-word to the storage unit 12. The storage unit 12 stores the wake-up-word outputted from the receiving unit 10.

The determination unit 14 determines whether the wake-up-word received by the receiving unit 10 satisfies a condition for an accuracy of voice recognition. The determination unit 14 outputs the determination result to the addition unit 16. The condition for the accuracy of voice recognition is that the number of syllables of the wake-up-word is expected to be equal to or greater than a first predetermined number. In voice recognition, when the number of syllables of a phrase subject to recognition is too small, the phrase is susceptible to false recognition. A first predetermined number may be appropriately set through experiments or simulations depending on the voice recognition performance of the voice recognition unit 30. The first predetermined number may be, for example, three.

When the determination unit 14 determines that the wake-up-word satisfies the condition for the accuracy of voice recognition, that is, the number of syllables of the wake-up-word is equal to or greater than the first predetermined number, the wake-up-word is appropriate. In this case, the wake-up-word stored in the storage unit 12 is used for voice recognition processing which will be explained hereinbelow.

When the determination unit 14 determines that the number of syllables of the wake-up-word is less than the first predetermined number, the addition unit 16 adds a predetermined additional word to the wake-up-word so that the number of syllables of the wake-up-word becomes equal to or greater than the first predetermined number. The addition unit 16 may place an additional word before the wake-up-word or may place an additional word after the wake-up-word. The addition unit 16 causes the storage unit 12 to store the new wake-up-word obtained by adding the additional word to the original wake-up-word, and deletes the original wake-up-word.

When the determination unit 14 determines that the number of syllables of the wake-up-word is less than the first predetermined number, the presentation unit 18 presents, to the user, the new wake-up-word to which the additional word was added by the addition unit 16. The presentation unit 18 may cause a display unit (not shown) to display the wake-up-word in the form of characters or may cause a speaker (not shown) and the like to output the wake-up-word in the form of voice.

For example, when a wake-up-word inputted by the user is "Pochi" and the first predetermined number is three, the number of syllables of the wake-up-word is determined to be two. The addition unit 16 then adds an additional word "Hello" to "Pochi" so that the number of syllables of the wake-up-word becomes equal to or greater than three. The presentation unit 18 presents the new wake-up-word "Hello Pochi" to which the additional word was added.

An operation of approving or not approving the new wake-up-word presented by the presentation unit 18 is inputted to the operation input unit 20 by the user. When the operation of approving the new wake-up-word is inputted to the operation input unit 20, the new wake-up-word stored in the storage unit 12, to which the additional word was added, is used for voice recognition processing which will be explained hereinbelow. When the operation of not approving the new wake-up-word is inputted to the operation input unit 20, the storage unit 12 deletes the new wake-up-word to which the additional word was added, and the receiving unit 10 receives, from the user, an input for registering a new wake-up-word.

Next, the voice recognition process that uses the wake-up-word stored in the storage unit 12 will be explained. The voice recognition unit 30 performs voice recognition for information on speech vocalized by the user to a microphone (not shown), and outputs the result of the voice recognition to the comparison unit 32. The comparison unit 32 compares the result of the voice recognition by the voice recognition unit 30 with the wake-up-word stored in the storage unit 12, and outputs a comparison result to the activation unit 34. When the comparison result is that the result of the voice recognition matches the wake-up-word, the activation unit 34 activates a predetermined application. When the comparison result is that the result of the voice recognition does not match the wake-up-word, the activation unit 34 does not activate the predetermined application.

In terms of hardware, the configuration may be realized by a CPU, memory, and other LSIs (large-scale integrated circuits) of a certain computer, and in terms of software, the configuration may be realized by a program and the like loaded in a memory, while functional blocks realized by a combination of hardware and software are illustrated here. Therefore, it is readily understood by those skilled in the art that these functional blocks may be realized by various configurations such as hardware, software, either alone or in combination thereof.

Figure 2:
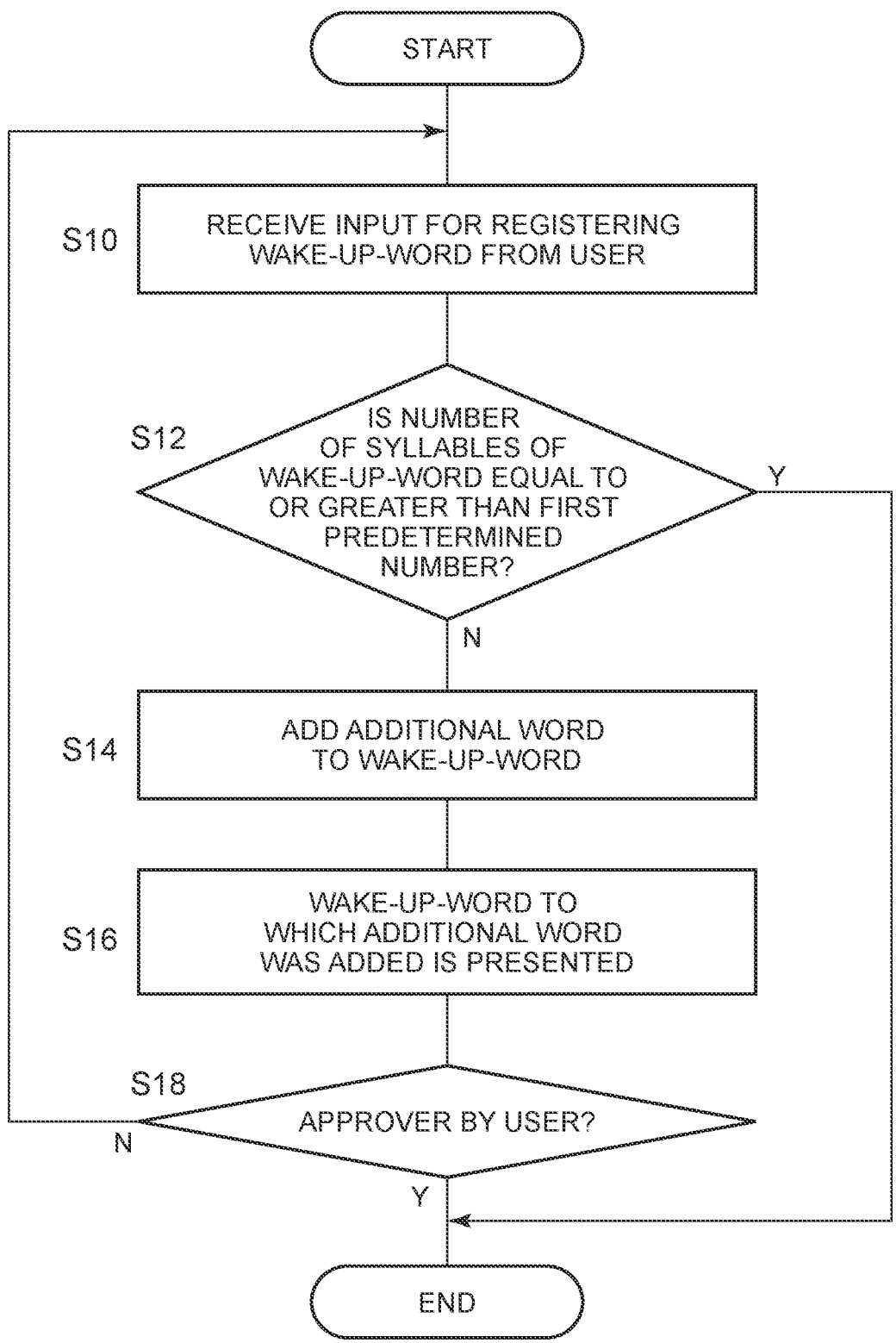
FIG. 2 is a flowchart showing the registration process of a wake-up-word in the information processing device as shown in FIG. 1.

Next, the overall operation of the information processing device 1 according to the configuration will be explained. FIG. 2 is a flowchart showing the registration process of a wake-up-word in the information processing device 1 as shown in FIG. 1. The receiving unit 10 receives, from a user, an input for registering the wake-up-word (S10), and when the number of syllables of the wake-up-word is equal to or greater than the first predetermined number (Y in S12), the registration process is finished. The wake-up-word now becomes available through this operation. On the other hand, when the number of syllables of the wake-up-word is less than the first predetermined number (N in S12), the addition unit 16 adds a predetermined additional word to the wake-up-word (S14), the presentation unit 18 presents the new wake-up-word to which the additional word was added (S16), and when the user approves the new wake-up-word with the additional word added (Y in S18), the registration process is finished. The new wake-up-word to which the additional word was added now becomes available through this operation. When the user does not approve the new wake-up-word in step S18 (N in S18), the operation returns to step S10.

According to this embodiment, whether the wake-up-word set by the user satisfies the condition for the accuracy of voice recognition is determined and therefore, it is possible to confirm whether the wake-up-word is appropriate, depending on the determination result.

When the number of syllables of the wake-up-word is less than the first predetermined number, the predetermined additional word is added to the wake-up-word so that the number of syllables of the wake-up-word becomes equal to or greater than the first predetermined number, and the new wake-up-word to which the additional words was added is displayed, and therefore, use of a wake-up-word susceptible to false recognition may be suppressed. Further, a wake-up-word with higher voice recognition accuracy may be presented while a wake-up-word set by the user is also used. In addition, the user can eliminate the effort of setting a new wake-up-word.

Second Embodiment

According to a second embodiment, the condition for the accuracy of voice recognition is different from that of the first embodiment. The differences between the second embodiment and the first embodiment will be explained below.

Figure 3:
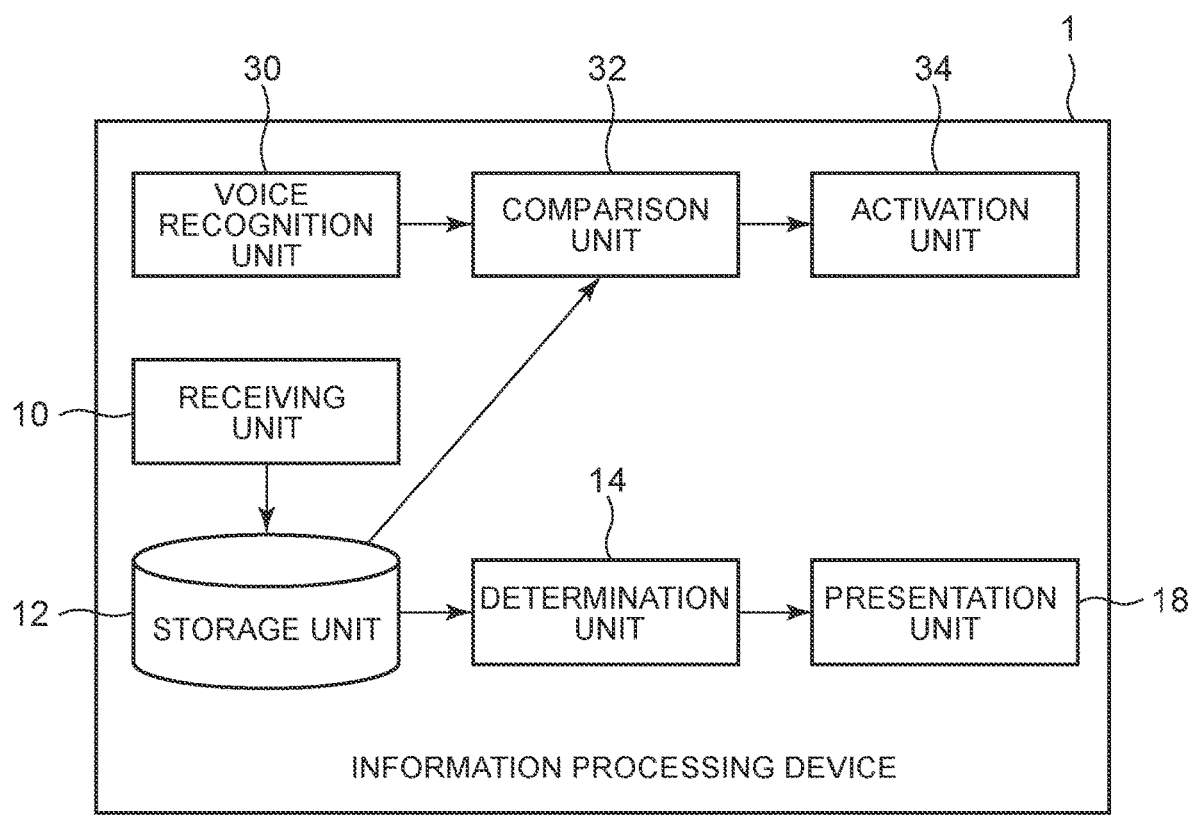
FIG. 3 is a block diagram showing the configuration of an information processing device according to a second embodiment.

FIG. 3 is a block diagram showing the configuration of the information processing device 1 according to the second embodiment. The information processing device 1 does not comprise the addition unit 16 and the operation input unit 20 as shown in FIG. 1, and the functions of a determination unit 14 and a presentation unit 18 are mainly different from those of the first embodiment.

The condition for the accuracy of voice recognition in the determination unit 14 is that the number of predetermined syllables susceptible to false recognition in a wake-up-word is expected to be less than a second predetermined number. In voice recognition, as syllables susceptible to false recognition exist, when a phrase subject to voice recognition includes too many syllables susceptible to false recognition, the phrase may often be falsely recognized. The predetermined syllables susceptible to false recognition and the second predetermined number may be appropriately set through experiments or simulations depending on the voice recognition capability of the voice recognition unit 30. The predetermined syllables susceptible to false recognition have relatively low syllable intensity and include, for example, the syllables of the "sa" column of the kana syllabary of the Japanese alphabet system, i.e. さ [sa], し [si], す [su], せ [se] and そ [so]. The second predetermined number may be, for example, three.

When the determination unit 14 determines that the number of predetermined syllables susceptible to false recognition in the wake-up-word is less than the second predetermined number, the wake-up-word is appropriate. In this case, the wake-up-word stored in the storage unit 12 is used for voice recognition processing.

When the determination unit 14 determines that the number of predetermined syllables susceptible to false recognition in the wake-up-word is equal to or greater than the second predetermined number, the presentation unit 18 presents, to the user, instructions to reset the wake-up-word by means of text or voice. The receiving unit 10 receives an input for registration of a new wake-up-word from the user.

Figure 4:
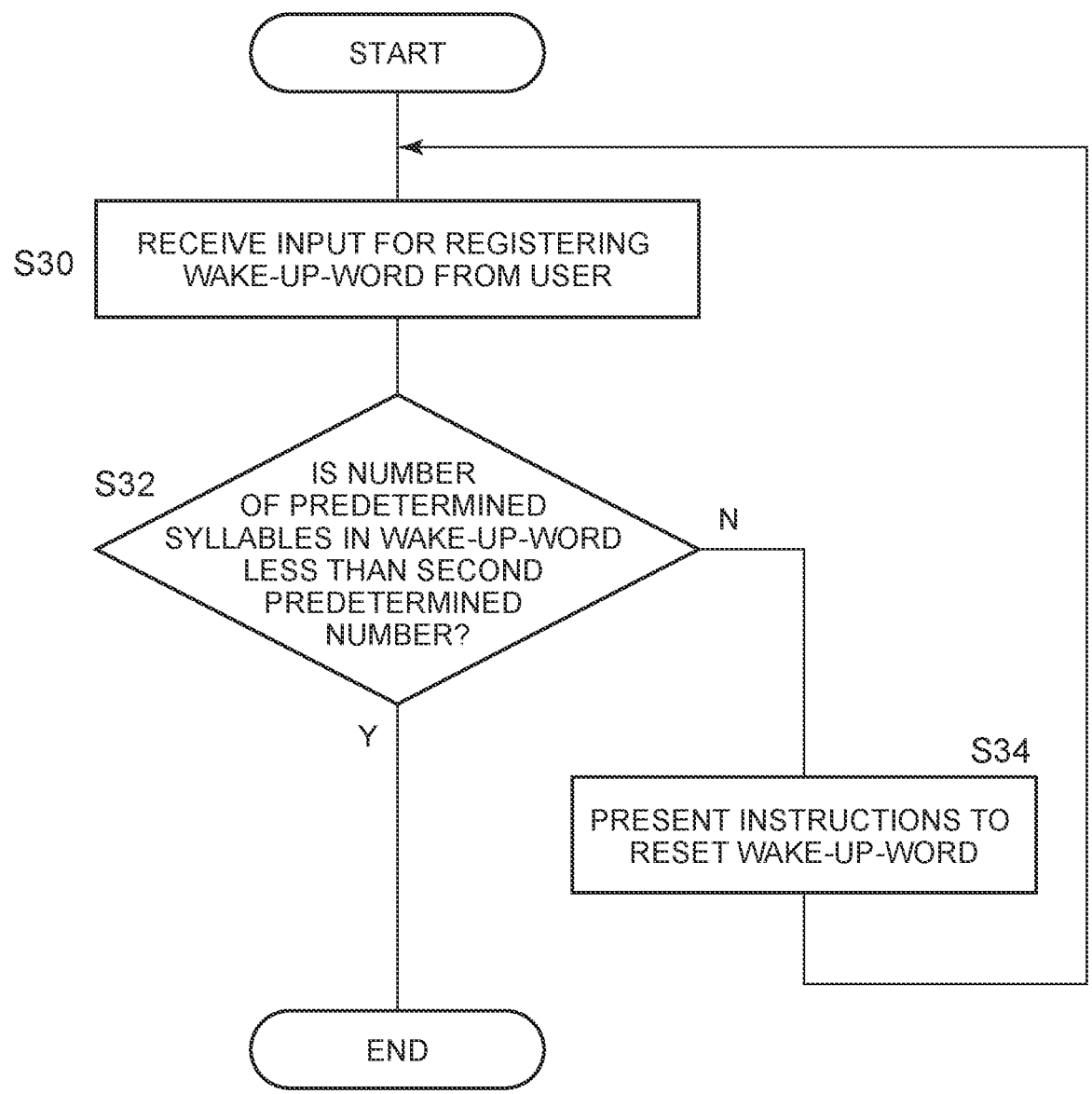
FIG. 4 is a flowchart showing the registration process of a wake-up-word in the information processing device as shown in FIG. 3.

Next, the overall operation of the information processing device 1 according to the above-mentioned configuration will be explained. FIG. 4 is a flowchart showing the registration process of a wake-up-word in the information processing device 1 as shown in FIG. 3. The receiving unit 10 receives an input for registering the wake-up-word from the user (S30), and when the number of the predetermined syllables in the wake-up-word is less than the second predetermined number (Y in S32), the registration process is finished. The wake-up-word now becomes available through this operation. When the number of the predetermined syllable in the wake-up-word is equal to or greater than the second predetermined number (N in S32), the presentation unit 18 presents instructions to reset the wake-up-word (S34), and the operation returns to step S30.

According to this embodiment, when the number of the predetermined syllables susceptible to false recognition in the wake-up-word is equal to or greater than the second predetermined number, the user is given instructions to reset the wake-up-word and therefore, use of a wake-up-word susceptible to false recognition may be suppressed.

Third Embodiment

A third embodiment is different from the first embodiment in that inputs for registration of a plurality of wake-up-words are received from a plurality of users. The difference between the third embodiment and the first embodiment will be mainly explained below.

The information processing device 1 according to the third embodiment is communally used by a plurality of users. Each of the plurality of users uses a different wake-up-word, and activates an application by unique settings for the wake-up-word. A block diagram of the information processing device 1 is the same as that shown in FIG. 1 and has thus been omitted here, while the functions of a receiving unit 10, a determination unit 14, an addition unit 16, a comparison unit 32, and an activation unit 34 are mainly different from those in the first embodiment.

The receiving unit 10 receives, from a plurality of users, inputs for registering a plurality of wake-up-words that are different from each other. The condition for the accuracy of voice recognition at the determination unit 14 is that when the receiving unit 10 has already received an input for registering a wake-up-word from the user while the receiving unit 10 receives an input for registering a new wake-up-word from another user, the degree of similarity in pronunciation between the already received wake-up-word and the newly received wake-up-word is expected to be less than a predetermined value. This is because, in voice recognition, two phrases with a high degree of similarity in pronunciation are difficult to distinguish from each other and are likely to be recognized as the same phrase. Various known technologies can be used to derive the degree of similarity in pronunciation. For example, the greater the number of identical phonemes in two wake-up-words is, the higher the degree of similarity in pronunciation may be derived. Further, the degree of similarity in pronunciation between two wake-up-words may be derived as the likelihood based on phoneme strings. The predetermined value may be appropriately set through experiments and simulations.

When the determination unit 14 determines that the degree of similarity in pronunciation between the already received wake-up-word and the newly received wake-up-word is less than the predetermined value, the newly received wake-up-word is deemed appropriate. In this case, the newly received wake-up-word stored in the storage unit 12 is used for voice recognition processing.

When the determination unit 14 determines that the degree of similarity in pronunciation is equal to or greater than the predetermined value, the addition unit 16 adds the predetermined additional word to the newly received wake-up-word. When the degree of similarity in pronunciation is determined to be equal to or greater than the predetermined value, the addition unit 16 may also add another additional word with a lower degree of similarity in pronunciation with the predetermined additional word to the already received wake-up-word. The presentation unit 18 presents the new wake-up-word to which the additional word was added by the addition unit 16. An operation of approving or not approving the wake-up-word presented by the presentation unit 18 is inputted to the operation input unit 20 by the user.

The storage unit 12 stores a plurality of wake-up-words alongside setting data of the application in association with each of the plurality of wake-up-words. The comparison unit 32 compares the result of voice recognition by the voice recognition unit 30 with the plurality of wake-up-words stored in the storage unit 12 and outputs the comparison result to the activation unit 34. When the comparison result is that the result of the voice recognition matches any one of the plurality of wake-up-words, the activation units activates the predetermined application by using the setting data associated with the matching wake-up-word with reference to the storage unit 12. The setting data associated with the wake-up-word used for activating the application is updated when the activated application is stopped and such. On the other hand, when the comparison result is that the result of the voice recognition matches none of the plurality of wake-up-words, the activation unit 34 does not activate the application.

Next, the overall operations of the information processing device 1 according to the above-mentioned configuration will be explained. FIG. 5 is a flowchart showing the registration process of a wake-up-word in the information processing device 1 according to the third embodiment. The receiving unit 10 receives an input for registering a wake-up-word from a user (S40) and newly receives an input for registering a wake-up-word from another user (S42), and when the degree of similarity in pronunciation between these two wake-up-words is less than the predetermined value (Y in S44), the registration process is finished. The wake-up-word now becomes available through this operation. When the degree of similarity in pronunciation between the two wake-up-words is equal to or greater than the predetermined value (N in S44), the addition unit 16 adds the predetermined additional word to the newly received wake-up-word (S46), the presentation unit 18 presents the new wake-up-word to which the additional word was added (S48), and when the user approves the new wake-up-word (Y in S50), the registration process is finished. The new wake-up-word to which the additional word was added becomes available by this operation. When the user does not approve the new wake-up-word in step S50 (N in S50), the operation returns to step S42.

According to this embodiment, when input for registering a plurality of wake-up-words is made by a plurality of users, it is possible to suppress use of a plurality of wake-up-words which are easily falsely recognized as identical. To this end, by registering a unique wake-up-word for each user, the application can be activated by settings specific for each user, such that convenience is improved. Further, a wake-up-word with higher voice recognition accuracy can be presented while the wake-up-word set by the user is used. Further, the user can eliminate effort of setting a new wake-up-word.

As described above, the disclosure is explained according to the embodiments. The embodiments have been presented by way of example only, and those skilled in the art would understand that various changes and modifications may be made in combination of each of the elements and each of the processing steps within the scope of the disclosure.

For example, when the first embodiment and the second embodiment are combined, the condition for the accuracy of voice recognition may be that the number of syllables of a wake-up-word is expected to be equal to or greater than the first predetermined number (hereafter referred to as "first condition") and that the number of predetermined syllables susceptible to false recognition in the wake-up-word is less than the second predetermined number (hereafter referred to as "second condition"). The second predetermined number may be the same as or different from the first predetermined number. When the first embodiment and the third embodiment are combined, the condition for the accuracy of voice recognition may be the first condition, and may be that the degree of similarity in pronunciation between the already received wake-up-word and the newly received wake-up-word is less than the predetermined value (hereafter referred to as "third condition"). When the second embodiment and the third embodiment are combined, the condition for the accuracy of voice recognition may be the second condition and the third condition. When the first embodiment, the second embodiment, and the third embodiment are combined, the condition for the accuracy of voice recognition may be the first condition, the second condition, and the third condition. New embodiments resulting from the combination will have all of the effects of each of the embodiments that are combined.

Further, according to the second embodiment, the presentation unit 18 may present, to the user, instructions to reset the wake-up-word when the determination unit 14 determines that the number of predetermined syllables susceptible to false recognition in the wake-up-word is equal to or greater than the second predetermined number and the predetermined syllables equal to or greater than the second predetermined number are consecutive. In this variation, it is possible to appropriately respond in cases where the accuracy of voice recognition can be ensured when the predetermined syllables equal to or greater than the second predetermined number are not consecutive even though the number of the predetermined syllables susceptible to false recognition is equal to or greater than the second predetermined number, and thus, the degree of freedom of setting a wake-up-word can be improved.

Further, according to the second embodiment, the presentation unit 18 may present, to the user, instructions to reset the wake-up-word when the determination unit 14 determines that the number of the predetermined syllables susceptible to false recognition in the wake-up-word is equal to or greater than the second predetermined number and that a ratio of the number of the predetermined syllables susceptible to false recognition to the number of syllables of the wake-up-word is equal to or greater than a predetermined ratio. Alternatively, the addition unit 16 and the operation input unit 20 are further provided as in the first embodiment, and when the determination unit 14 determines the same situation as mentioned above, the addition unit 16 may add the predetermined additional word to the wake-up-word instead of presenting, to the user, instructions to reset the wake-up-word such that the ratio may be less than the predetermined ratio. It is preferable for the additional word to not include the predetermined syllables susceptible to false recognition. As such, even if the number of the predetermined syllables susceptible to false recognition is equal to or greater than the second predetermined number, the wake-up-word may be determined to be appropriate when the ratio of the number of the predetermined syllables susceptible to false recognition to the number of syllables of the wake-up-word is less than the predetermined ratio. For example, when the wake-up-word inputted by the user is "Sashiko [sa-si-ko]," the second predetermined number is two, and the predetermined ratio is 50%, "Sashiko" includes two syllables in the "sa" column of the kana syllabary of the Japanese alphabet system, which are susceptible to false recognition. Since the ratio of the syllables of the "sa" column is 66.6%, it is determined that the wake-up-word is inappropriate, and thus, instructions to reset the wake-up-word is presented or a new wake-up-word to which the additional word is added is presented. When the additional word is to be added, the addition unit 16 adds the additional word "Hello" so that the ratio of the syllables of the "sa" column may become less than 50%. The presentation unit 18 presents "Hello Sashiko" which is the wake-up-word to which the additional word was added. Although "Hello Sashiko" includes two syllables of the "sa" column, the ratio of syllables of the "sa" column is 40% and thus this wake-up-word is appropriate. In this variation, it is possible to appropriately respond in cases where the accuracy of voice recognition can be secured when the ratio of the number of the predetermined syllables susceptible to false recognition to the number of syllables of the wake-up-word is small even if the number of the predetermined syllables susceptible to false recognition is equal to or greater than the second predetermined number, such that the degree of freedom of setting a wake-up-word can be increased.

What is claimed is:

1. An information processing device that enables a user to register a wake-up-word for activating a predetermined function by voice recognition, the information processing device comprising:
a receiving unit configured to receive, from the user, an input word for registration as a wake-up-word; and
a determination unit configured to determine whether the input word received by the receiving unit satisfies a condition for an accuracy of voice recognition,
wherein the condition is that the number of syllables of the input word is equal to or greater than a predetermined number, and
wherein the information processing device further comprises:
an addition unit configured to add a predetermined additional word to the input word so that the number of syllables of the input word becomes equal to or greater than the predetermined number, when the determination unit determines that the number of syllables of the input word is less than the predetermined number; and
a presentation unit configured to present the input word to which the additional word was added by the addition unit.

2. The information processing device according to claim 1, further comprising a storage unit configured to store the received input word as the wake-up-word when the received input word satisfies the condition.

3. An information processing device that enables a user to register a wake-up-word for activating a predetermined function by voice recognition, the information processing device comprising:
a receiving unit configured to receive, from the user, an input word for registration as a wake-up-word; and
a determination unit configured to determine whether the input word received by the receiving unit satisfies a condition for an accuracy of voice recognition,
wherein the condition is that the number of predetermined syllables susceptible to false recognition in the input word is less than three a predetermined number, and
wherein the information processing device further comprises a presentation unit configured to present instructions for the user to reset the wake-up-word when the determination unit determines that the number of the predetermined syllables in the input word is equal to or greater than three.

4. The information processing device according to claim 3, wherein the predetermined syllables susceptible to false recognition include syllables of the "sa" column of the kana syllabary of the Japanese alphabet system.

5. An information processing device that enables a user to register a wake-up-word for activating a predetermined function by voice recognition, the information processing device comprising:
a receiving unit configured to receive, from the user, an input word for registration as a wake-up-word; and
a determination unit configured to determine whether the input word received by the receiving unit satisfies a condition for an accuracy of voice recognition, wherein the condition is that the number of predetermined syllables susceptible to false recognition in the input word is expected to be less than a predetermined number, and wherein the information processing device further comprises:

an addition unit configured to, when the determination unit determines that the number of the predetermined syllables susceptible to false recognition in the input word is equal to or greater than a predetermined number, add a predetermined additional word to the input word so that a ratio of the number of the predetermined syllables susceptible to false recognition to the number of syllables of the input word becomes less than a predetermined ratio; and a presentation unit configured to present the input word to which the additional word was added by the addition unit.

6. The information processing device according to claim 5, wherein the predetermined syllables susceptible to false recognition include syllables of the "sa" column of the kana syllabary of the Japanese alphabet system.

7. An information processing device that enables a user to register a wake-up-word for activating a predetermined function by voice recognition, the information processing device comprising:

a receiving unit configured to receive, from the user, an input word for registration as a wake-up-word; and a determination unit configured to determine whether the input word received by the receiving unit satisfies a condition for an accuracy of voice recognition, wherein the condition is that when the receiving unit has already received a first input word for registration as a wake-up-word from a first user while the receiving unit newly receives a second input word for registration as a wake-up-word from a second user, a degree of similarity in pronunciation between the first input word and the second input word is less than a predetermined value, and wherein the information processing device further comprises:

an addition unit configured to add a predetermined additional word to the second input word when the determination unit determines that the degree of similarity in pronunciation is equal to or greater than the predetermined value; and a presentation unit configured to present the second input word to which the additional word was added by the addition unit.

8. The information processing device according to claim 7, wherein the degree of similarity in pronunciation is derived based on the number of identical phonemes between the first input word and the second input word, or is derived as likelihood of the degree of similarity based on phoneme strings of the first input word and the second input word.

9. An in-vehicle device for activating a predetermined function by voice recognition, the in-vehicle device comprising:

a receiving unit configured to receive, from a user, an input word for registration as a wake-up-word for activating a predetermined function by voice recognition;

a determination unit configured to determine whether the input word received by the receiving unit satisfies a condition for an accuracy of voice recognition;

a storage unit configured to store the received input word as the wake-up-word when the received input word satisfies the condition for the accuracy of voice recognition;

a voice recognition unit configured to, after the wake-up-word is stored in the storage unit, perform voice recognition for information on speech spoken by the user;

a comparison unit configured to compare a voice recognition result with the wake-up-word stored in the storage unit and outputting a comparison result; and an activation unit configured to activate the predetermined function when the comparison result is that the voice recognition result matches the wake-up-word, wherein the condition is that the number of syllables of the input word is equal to or greater than a predetermined number, and wherein the in-vehicle device further comprises:

an addition unit configured to add a predetermined additional word to the input word so that the number of syllables of the input word becomes equal to or greater than the predetermined number, when the determination unit determines that the number of syllables of the input word is less than the predetermined number; and a presentation unit configured to present the input word to which the additional word was added by the addition unit.

10. A non-transitory computer readable storage medium, wherein the storage medium stores a program, the program comprising commands that, when executed by a processor, cause the processor to perform the steps of:

receiving, from a user, an input word for registration as a wake-up-word for activating a predetermined function by voice recognition; and determining whether the received input word satisfies a condition for an accuracy of voice recognition, wherein the condition is that the number of syllables of the input word is equal to or greater than a predetermined number, and wherein the non-transitory computer readable storage medium further comprises:

an addition unit configured to add a predetermined additional word to the input word so that the number of syllables of the input word becomes equal to or greater than the predetermined number, when the determination unit determines that the number of syllables of the input word is less than the predetermined number; and a presentation unit configured to present the input word to which the additional word was added by the addition unit.

* * * * *